United States Patent
Lin et al.

(10) Patent No.: US 8,303,922 B2
(45) Date of Patent: Nov. 6, 2012

(54) METHOD FOR EXFOLIATION OF HEXAGONAL BORON NITRIDE

(75) Inventors: Yi Lin, Newport News, VA (US); John W. Connell, Yorktown, VA (US)

(73) Assignee: The United States of America as represeted by the Administrator of the National Aeronautics and Space Administration, Washington, DC (US)

( * ) Notice: Subject to any disclaimer, the term of this patent is extended or adjusted under 35 U.S.C. 154(b) by 452 days.

(21) Appl. No.: 12/546,185

(22) Filed: Aug. 24, 2009

(65) Prior Publication Data

US 2011/0045223 A1 Feb. 24, 2011

(51) Int. Cl.
| | |
|---|---|
| C01B 21/064 | (2006.01) |
| C01B 35/10 | (2006.01) |
| C01B 35/00 | (2006.01) |
| B29C 47/00 | (2006.01) |
| C07K 1/00 | (2006.01) |
| C07K 14/00 | (2006.01) |
| C07K 16/00 | (2006.01) |
| C07C 205/00 | (2006.01) |
| A62D 3/00 | (2007.01) |
| B01J 19/12 | (2006.01) |
| C08F 110/00 | (2006.01) |
| C08G 73/10 | (2006.01) |

(52) U.S. Cl. ....... 423/290; 423/276; 423/277; 428/36.9; 530/409; 530/369; 530/364; 562/553; 204/157.43; 204/157.4; 521/143; 521/189; 524/404; 442/417

(58) Field of Classification Search ................... None
See application file for complete search history.

(56) References Cited

OTHER PUBLICATIONS

Taniguchi et al.; Structure of Chemically Derived Mono- and Few-Atomic-Layer Boron Nitride Sheets; Applied Physics Letters; 93 223103; 2008.*
Pal et al.; Functionalization and Solubilization of BN Nanotubes by Interaction with Lewis Base; J. Mater. Chem.; 17, pp. 450-452; 2207.*

* cited by examiner

*Primary Examiner* — Melvin C Mayes
*Assistant Examiner* — Guinever Gregorio
(74) *Attorney, Agent, or Firm* — Andrea Z. Warmbier; Thomas K. McBride, Jr.; Linda B. Blackburn

(57) ABSTRACT

A new method is disclosed for the exfoliation of hexagonal boron nitride into mono- and few-layered nanosheets (or nanoplatelets, nanomesh, nanoribbons). The method does not necessarily require high temperature or vacuum, but uses commercially available h-BN powders (or those derived from these materials, bulk crystals) and only requires wet chemical processing. The method is facile, cost efficient, and scalable. The resultant exfoliated h-BN is dispersible in an organic solvent or water thus amenable for solution processing for unique microelectronic or composite applications.

14 Claims, 4 Drawing Sheets

METHOD FOR EXFOLIATION OF HEXAGONAL BORON NITRIDE

ORIGIN OF THE INVENTION

The invention described herein was made by an employee of the United States Government and may be manufactured and used by or for the Government of the United States of America for governmental purposes without the payment of any royalties thereon or therefor.

TECHNICAL FIELD

The present invention generally relates to a method for the exfoliation of hexagonal boron nitride (h-BN) crystals into two-dimensional nanosheets with one or few (less than ten) atomic layers. The method allows for the preparation of the exfoliated h-BN nanosheets using a one-step chemical process that is scalable. The exfoliated h-BN nanosheets are dispersible in various organic solvents and/or water, depending upon the processing chemicals.

BACKGROUND

The discovery of monolayer graphene sheets proved that two-dimensional materials with only one layer of atoms can stably exist with or without substrate support. Mono- and few-layered graphene sheets have since stimulated much excitement not only because they are novel materials of excellent mechanical, electrical, and thermal properties, but also because their preparation could be readily achieved in large scale using known or intuitively derived methods. For example, few-layered graphene sheets can be prepared by treatment of graphite using strong oxidative acid for carbon oxidation and thus exfoliation to form few-layered graphite oxide, which could then be reduced to graphene.

Hexagonal boron nitride (h-BN), sometimes called white graphite, is structurally analogous to graphite, with the layered sheets similarly held together by van der Waals forces. Compared to the all-carbon structure of graphene, each hexagonal boron nitride (h-BN) sheet is composed of boron and nitrogen atoms alternatively positioned in the planar hexagonal crystal structure. The interlayer structure of h-BN is such that the boron and nitrogen atoms in adjacent layers eclipse one another due to the polarity of the two atoms, forming so-called AB stacking. Different from graphite, h-BN is highly inert to oxidative environment. More specifically, it is stable against heating in oxygen environment up to 800° C. or above and also strong oxidative acid treatment.

Similar to the exfoliated graphene nanosheets structures, the mono- or few-layered h-BN may provide unique mechanical, thermal, and electrical properties that are superior to that of the bulk h-BN material. Exfoliated h-BN nanosheets have excellent thermal properties, but are electrically insulating, different from their conductive graphene counterparts.

Prior art methods of forming thin h-BN sheets include chemical vapor deposition of h-BN on a metal surface, micromechanical cleavage, and sonication. With chemical vapor deposition, the resultant two-dimensional h-BN nanostructures are supported on the metal surfaces and thus not available in freestanding forms for applications such as for coatings and composites. Micromechanical cleavage from h-BN powder or single-crystal was achieved, in one example, by applying adhesive tape to h-BN powder and then attaching the tape to a 300 nm thick silicon oxide substrate. Only minute amounts of few-layered h-BN nanosheets were obtained on the substrate. No mono-layer h-BN was obtained. Sonication of h-BN single-crystal in 1,2-dichloroethane in the presence of a conjugate polymer [poly(m-phenylenevinylene-co-2,5,-dictoxy-p-phenylenevinylene] yielded h-BN with few layers. No free-standing mono-layer h-BN was found. Sonication of h-BN powder in a polar organic solvent, i.e. N,N-dimethylformamide (DMF), without surfactant yielded h-BN nanosheets with few layers (as few as 3 layers).

SUMMARY OF THE INVENTION

In view of the above, there is a need for a chemical method to prepare exfoliated h-BN nanosheets (or nanoplatelets, nanomeshes, nanoribbons) from h-BN powder or single-crystal starting materials that is scalable. Therefore a method to satisfy this need is disclosed in the instant invention.

Exfoliated h-BN nanosheets prepared from this method are unique and useful in a variety of applications such as dielectric coating with excellent heat dissipation properties ("thermal paste"), spintronics, and thermally conductive but electrically insulating fillers for polymer or ceramic composites.

It is an object of the present invention to provide a synthetic method for the exfoliation of thick h-BN crystals (for instance, more than 150 layers or more than 50 nm) into thinner, i.e. few-layered (for instance, less than 30 layers or less than 10 nm) and mono-layered h-BN nanosheets (or nanoplatelets, nanomeshes, nanoribbons).

It is another object of the present invention to provide a synthetic method to obtain exfoliated h-BN nanosheets (or nanoplatelets, nanomeshes, nanoribbons) as a simple chemical process with convenient work-up processes.

It is yet another object of the present invention to provide exfoliated h-BN nanosheets (or nanoplatelets, nanomeshes, nanoribbons) that are dispersible in organic solvents and/or water for subsequent wet processing in various applications.

The above summary of the present invention is not intended to describe each illustrated embodiment or every implementation of the present invention. The detailed description, which follows, particularly exemplifies these embodiments.

DETAILED DESCRIPTION OF EXEMPLARY EMBODIMENTS

Figures 1A, 1B, 1C, 1D:
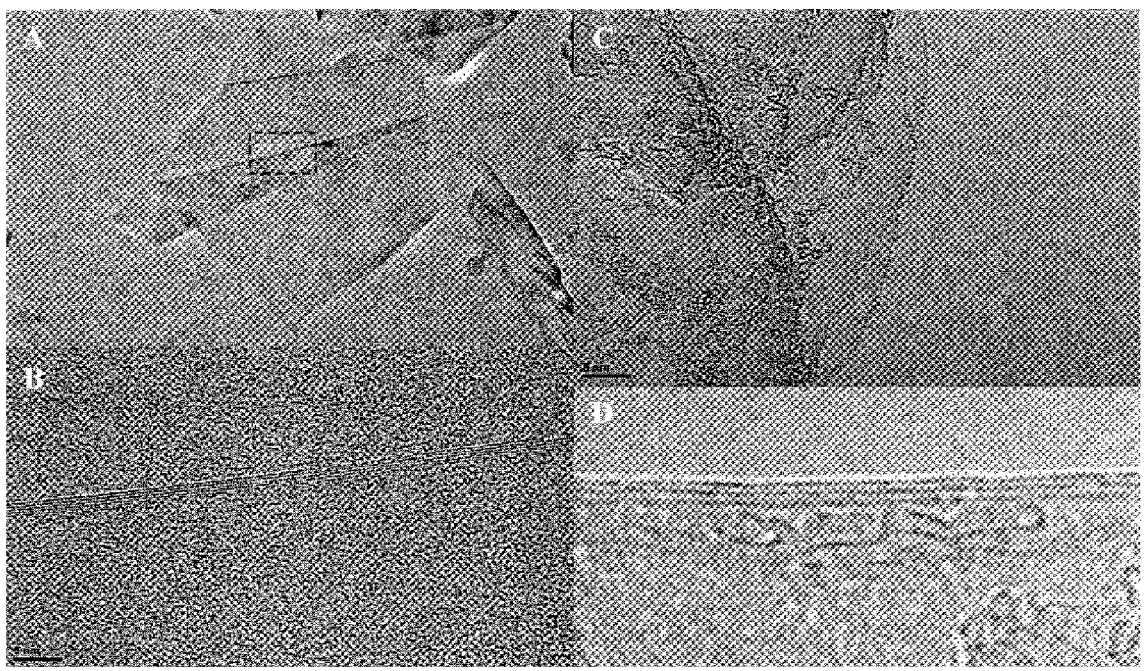
FIGS. 1A-1D are transmission electron micrographs of exfoliated h-BN nanosheets.

The present invention pertains to a chemical method to exfoliate h-BN layered crystalline structures for the formation of mono- and few-layered h-BN nanosheets (or nanoplatelets, nanomeshes, nanoribbons) structures. More specifically, a Lewis base compound is used as a critical component in the process for the exfoliation of h-BN. These h-BN structures are useful in a variety of applications such as dielectric coating with excellent heat dissipation properties ("thermal paste"), spintronics, and thermally conductive but electrically insulating fillers for polymer or ceramic composites (i.e. coating, free-standing film, fiber, foam, molded article, adhesive formulation and fiber reinforced composite).

The term "h-BN" or "hexagonal boron nitride" refers to the compound in any solid form or crystal size. The typical forms of h-BN include but are not limited to powder or single-crystal. The typical crystal size of h-BN powder is in the range of a few nanometers (nm) to tens of micrometers (µm) and can be up to a few millimeters (mm) for h-BN single-crystals. h-BN powders can be obtained from commercial vendors including but not limited to UK Abrasives, Inc., Momentive Performance Materials, Inc., and Kennmetal Inc. h-BN compounds can be either used as received, or subject to mechanical breakdown by direct ball-milling or ultrasonication in a solvent, or the exfoliated product from one or multiple repeated rounds of the same or different Lewis base treatment described herein. h-BN compounds used in the exfoliation reactions described herein can also be preloaded with moieties such as organic functionalities, inorganic groups, or nanoparticles (such as metal or metal oxides).

The terms "nanosheets," or alternatively, "nanoplatelets, nanomeshes, nanoribbons" used in context to describe the h-BN particle size mean that the average thicknesses of the exfoliated h-BN structures is typically less than 10 nm, but the facial area of the nanostructures can range from a few tens of $nm^2$ to hundreds of $\mu m^2$. One or both of the planar dimensions of the exfoliated h-BN structures can be as small as a few nanometers.

In the method, at least one form of h-BN compound and at least one Lewis base are mixed at a desired ratio. It is preferred, but not required, to have at least one Lewis base molecule per boron atom in h-BN. After mixing is completed, the mixture is subject to stirring at room temperature, or treatment using energy input for a period of time ranging from 1 h to 7 days. The forms of energy input include but are not limited to heat, sonication, mechanical shearing, ball-milling, and microwave. After reaction, the exfoliated h-BN nanosheets (or nanoplatelets, nanomeshes, nanoribbons) are extracted by centrifugation or filtration. The extraction can be done directly if the reaction mixture is a dispersion or with added solvents if the reaction mixture is solid at room temperature. When centrifugation is used, the supernatant is usually collected as the desired exfoliated h-BN nanosheets product. However, the remaining solid from the centrifugation could be further extracted by solvents under the same or different centrifugation speed. When filtration is used, whether the filtrate or filtered solid is collected as the desired exfoliated h-BN nanosheets product depends upon the pore size of the filter paper or membrane.

Preferred Lewis bases are water, inorganic bases such as sodium hydroxide and potassium hydroxide, primary, secondary and tertiary amine and phosphine compounds, amino acids, proteins, mercaptans (thiols) or mixtures thereof. In general terms, the Lewis base may be an amine compound, sulfur compound, phosphorous compound, oxide compound, water, amino acid, protein molecule or mixtures thereof. In more specific examples, the Lewis base may be water, 1-dodecanethiol, octadecylamine, amine-terminated poly (ethylene glycol), glycine, leucine, ferritin protein, bovine serum albumin, potassium hydroxide, sodium hydroxide or mixtures thereof. The Lewis base used in the reaction mixture is preferred to be in the liquid state (melt) or solution.

Mechanistically, Lewis base compounds readily form adducts with electron deficient boron-sites on h-BN surface or defect sites. The formation of adducts may gradually disrupt the van der Waals force of the boron-nitrogen pairs between adjacent h-BN layers, forming intercalated and eventually exfoliated products. Thus, the exfoliation efficiency, i.e., the average number of layers and the amount of h-BN that are exfoliated, may be related to the electron donation capability of the Lewis base used, the period of treatment, and the intensity of energy input that includes but is not limited to heat, sonication, mechanical shearing, ball-milling, and microwave.

The exfoliated h-BN product or remains from one cycle of Lewis base treatment can be subject to another or multiple rounds of treatment. In the additional round(s), the Lewis base compound(s), treatment time, and the intensity of energy input can be the same or different. The resultant product is also exfoliated nanosheets (or nanoplatelets, nanomeshes, nanoribbons).

The amount of exfoliated h-BN nanosheets (or nanoplatelets, nanomeshes, nanoribbons) is characterized by weight balance of the extracted product described herein. The number of layers and the area of the nanosheets are determined by scanning electron microscopy (SEM), regular or high resolution transmission electron microscopy (TEM or HR-TEM), and atomic force microscopy (AFM).

The exfoliated h-BN nanosheets (nanoplatelets, nanomeshes, nanoribbons) of the present invention can be used to produce polymer composites by combining them with other commodity and engineering plastics to produce novel materials with advantageous characteristics. The term "polymer composites", as used herein, refers to a composition that comprises at least one form of exfoliated h-BN and at least one other polymer. The other polymers may be commodity or engineering plastics including, but not limited to, polycarbonate, polyacrylate, polyacrylonitrile, polyester, polyamide, polystyrene (including high impact strength polystyrene), polyurethane, polyurea, polyurethaneurea, polyepoxy, poly (acrylonitrile butadiene styrene), polyimide, polyarylate, poly(arylene ether), polyethylene, polypropylene, polyphenylene sulfide, poly(vinyl ester), polyvinyl chloride, poly (vinyl alcohol), bismaleimide polymer, polyanhydride, liquid crystalline polymer, cellulose polymer, or any combination thereof. These polymers are available from multiple, well-known commercial suppliers. The polymer composites may be produced via blending, mixing, or compounding the constituent materials.

It is contemplated that the polymer composites may comprise other components, such as fillers, surfactants, organic binders, polymeric binders, crosslinking agents, coupling agents, anti-dripping agents, heat stabilizers, antioxidants, colorants, inks, dyes, or any combination thereof.

The polymer composites can be used as coatings or they can be used to fabricate articles, such as free-standing films, fibers, foams, molded articles, adhesives and fiber reinforced composites. These articles may be well-suited for applications requiring thermal conductivity, catalytic activity, mechanical reinforcement, insulating coating, or combinations thereof.

In summary, the present invention discloses a method to exfoliate h-BN layered crystalline structures for the formation of mono- and few-layered h-BN nanosheets (or nanoplatelets, nanomeshes, nanoribbons) using Lewis base compounds. Among the wide selection of Lewis bases, compounds as simple as water can be used for the exfoliation of h-BN without any other added compositions. h-BN nanostructures thus obtained can be used impurity-free in electronics and composites. Additionally, the h-BN nanostructures obtained by using any Lewis base can be combined with polymers to produce polymer composites with a unique combination of physical, thermal, electrical, mechanical and biological properties.

EXAMPLES

Having generally described the invention, a more complete understanding thereof may be obtained by reference to the following examples that are provided for purposes of illustration only and do not limit the invention.

Example 1

Exfoliated h-BN Nanosheets from Thermal Reaction of As-Received h-BN with Octadecylamine The as-received h-BN powder (50 mg, UK Abrasives, size −10P, lot HZ010PA4.$06) and octadecylamine (500 mg, Aldrich) were mixed and stirred in a round-bottom flask and heated to ~160° C. for 6 days under steady nitrogen flow. Upon cooling the reaction mixture to room temperature, tetrahydrofuran (THF, ~15 mL) was added, and the slurry was briefly sonicated and centrifuged (~5000 rpm, 10 min) for the collection of the transparent but slightly milky supernatant. The extraction cycle was repeated a few times, and the supernatants were combined to obtain a THF dispersion of exfoliated h-BN nanosheets. THF could be evaporated to obtain the exfoliated h-BN nanosheets as solid powder, which could be re-dissolved into THF and other organic solvents such as chloroform.

Figures 2A, 2B:
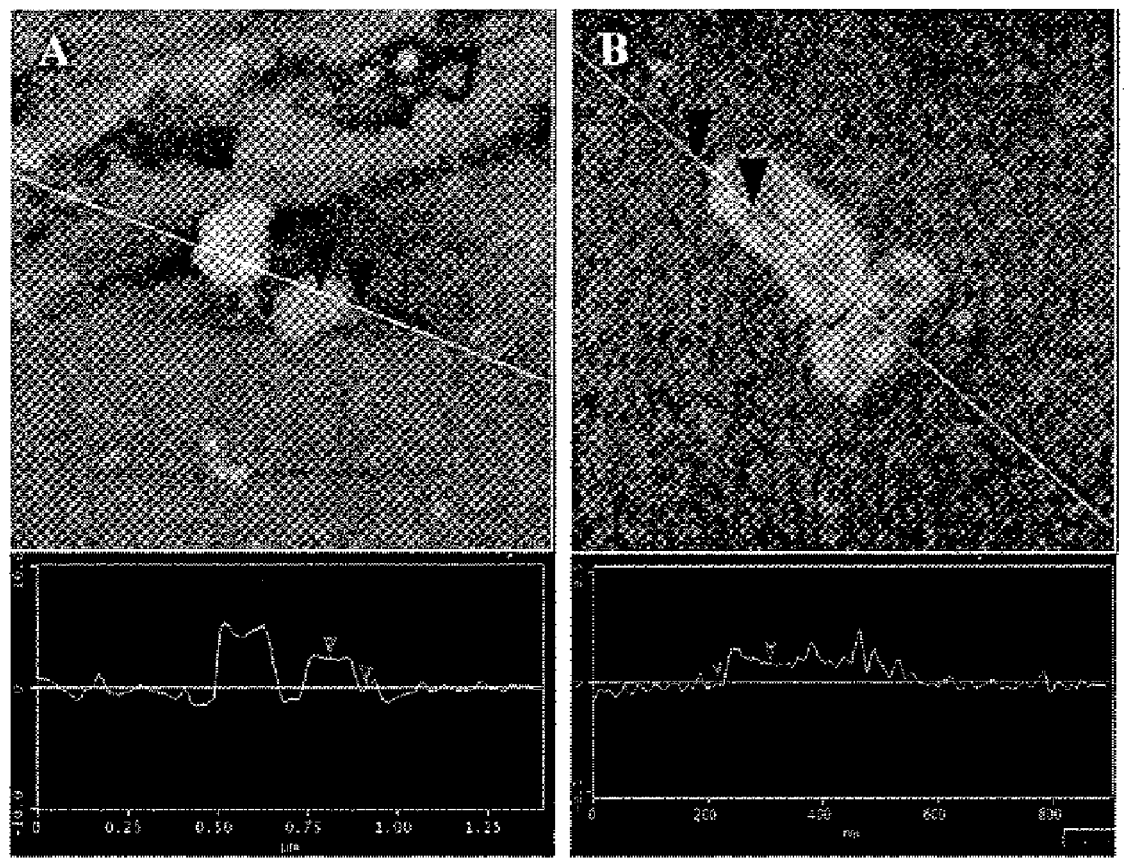
FIGS. 2A-2B are atomic force micrographs of exfoliated h-BN nanosheets and corresponding height profiles along the white line depicted in the micrograph showing thicknesses of the nanosheets.

FIG. 2A shows the exfoliated h-BN nanosheets from treatment of as-received h-BN with octadecylamine.

Example 2

Exfoliated h-BN Nanosheets from Thermal Reaction of As-Received h-BN with Amine-Terminated Poly(ethylene glycol)

The as-received h-BN powder (50 mg, UK Abrasives, size −10P, Lot HZ010PA4.$06) and amine-terminated poly(ethylene glycol) (500 mg, Aldrich, molecular weight~1,500) were mixed and stirred in a round-bottom flask and heated to ~160° C. for 6 days under steady nitrogen flow. Upon cooling the reaction mixture to room temperature, water (~15 mL) was added, and the slurry was briefly sonicated and centrifuged (~5000 rpm, 10 min) for the collection of the transparent but slightly milky supernatant. The extraction cycle was repeated a few times, and the supernatants were combined to obtain an aqueous dispersion of exfoliated h-BN nanosheets. Water could be evaporated to obtain the exfoliated h-BN nanosheets as solid powder, which could be re-dissolved into water and some organic solvents such as chloroform.

FIGS. 1A-1D are transmission electron micrographs showing the morphology and the number of layers of the exfoliated h-BN nanosheets. The exfoliated h-BN was from treatment of as-received h-BN with amine-terminated poly(ethylene glycol) as described herein. FIG. 1A shows an exfoliated h-BN nanosheet with area of approximately 0.16 μm². FIG. 1B was the magnified image from the rectangle area shown in FIG. 1A, where the number of h-BN nanosheets layers can be counted from the folded edge to be six. FIG. 1C depicts the edge of an exfoliated h-BN nanosheet, where a single h-BN layer protrudes from the structure. FIG. 1D shows the folded edge of yet another h-BN nanosheet which has three layers.

Example 3

Exfoliated h-BN Nanosheets from Thermal Reaction of h-BN (from Ball-Milling of 10 Minutes) with Octadecylamine The as-received h-BN powder (1 g, UK Abrasives, size −10P, Lot HZ010PA4.$06) was subjected to ball-milling (SPEX CertiPrep 8000D High-Energy Shaker Mill) for 10 minutes. The h-BN powder thus obtained (50 mg) was subject to the same reaction with octadecylamine (500 mg) and work-up process as those described in Example 1. A THF dispersion of exfoliated h-BN nanosheets was obtained. THF could be evaporated to obtain the exfoliated h-BN nanosheets as solid powder, which could be re-dissolved into THF and other organic solvents such as chloroform.

Example 4

Exfoliated h-BN Nanosheets from Thermal Reaction of h-BN (from Ball-Milling of 30 Minutes with Octadecylamine The process was the same as Example 3 except the ball-milling time was 30 minutes. A THF dispersion of exfoliated h-BN nanosheets was obtained. THF could be evaporated to obtain the exfoliated h-BN nanosheets as solid powder, which could be re-dissolved into THF and other organic solvents such as chloroform.

Example 5

Exfoliated h-BN Nanosheets from Thermal Reaction of h-BN (from Ball-Milling of 60 minutes) with Octadecylamine The process was the same as Example 3 except the ball-milling time was 60 minutes. A THF dispersion of exfoliated h-BN nanosheets was obtained. THF could be evaporated to obtain the exfoliated h-BN nanosheets as solid powder, which could be re-dissolved into THF and other organic solvents such as chloroform.

Example 6

Exfoliated h-BN Nanosheets from Thermal Reaction of h-BN (from Ball-Milling of 30 Minutes with Amine-Terminated Poly(ethylene glycol)

The h-BN powder ball-milled for 30 minutes (50 mg) was subject to the same reaction with amine-terminated poly(ethylene glycol) (500 mg, Aldrich, molecular weight~1,500) and work-up process as those described in Example 2. Aqueous dispersion of exfoliated h-BN nanosheets was obtained. Water could be evaporated to obtain the exfoliated h-BN nanosheets as solid powder, which could be re-dissolved into water and some organic solvents such as chloroform.

FIG. 2B shows the exfoliated h-BN nanosheets from treatment of h-BN (from ball-milling of 30 minutes) with amine-terminated poly(ethylene glycol). The height profiles showed that the thickness of the exfoliated h-BN nanosheets in the images are in the range of 2-7 nm, or 6-20 layers.

Example 7

Exfoliated h-BN Nanosheets from Microwave Reaction of h-BN from Ball-Milling of 30 Minutes) with Octadecylamine

The h-BN powder was ball-milled for 30 minutes (20 mg) and subsequently mixed with octadecylamine (200 mg) and stirred in a microwavable test-tube and heated to ~120° C. for 5 minutes and then 180° C. for 1 h at 50 W. Upon cooling the reaction mixture to room temperature, tetrahydrofuran (THF, ~15 mL) was added, and the slurry was briefly sonicated and centrifuged (~5000 rpm, 10 min) for the collection of the transparent but slightly milky supernatant. The extraction cycle was repeated a few times, and the supernatants were combined to obtain a THF dispersion of exfoliated h-BN nanosheets. THF could be evaporated to obtain the exfoliated h-BN nanosheets as solid powder, which could be re-dissolved into THF and other organic solvents such as chloroform.

Example 8

Exfoliated h-BN Nanosheets from Sonication Reaction of As-Received h-BN with Water

Figure 5:
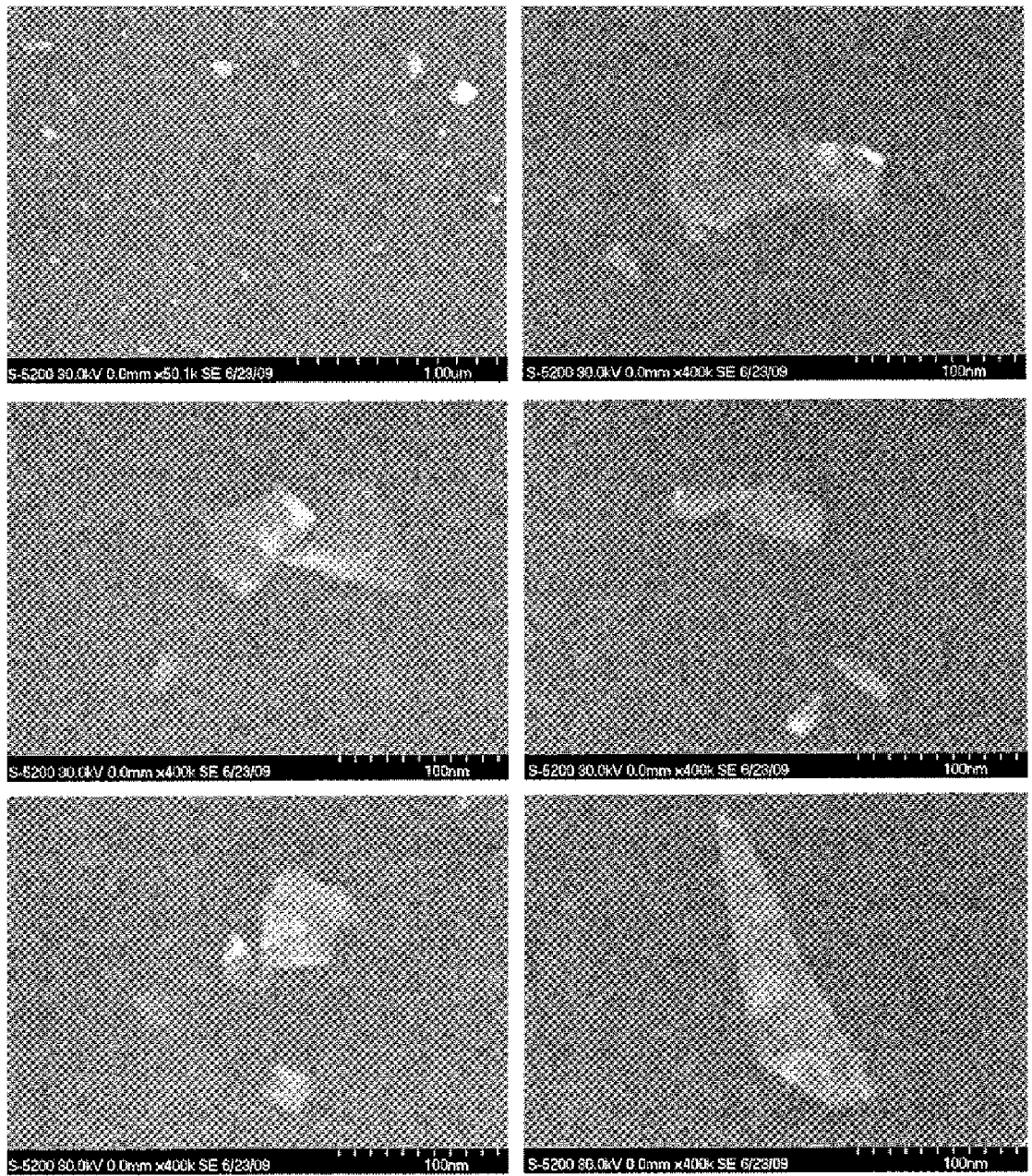
FIG. 5 is a series of scanning electron micrographs of exfoliated h-BN nanosheets using water as the exfoliation agent.

The as-received h-BN powder (20 mg) was added to deionized water (10 mL) and sonicated in a bath sonicator (Branson Model 2510) for 8 h. The mixture was centrifuged (~5000 rpm, 10 min) for the collection of the transparent but slightly milky supernatant. Water was added to the residue, the slurry was sonicated and subjected to another round of centrifugation. The extraction cycle was repeated a few times, and the supernatants were combined, and filtered through a coarse filter. The filtrate, an aqueous dispersion of exfoliated h-BN nanosheets, was obtained. The filtrate was further centrifuged at 14,000 rpm for 30 min, and an aqueous dispersion of exfoliated h-BN nanosheets with average planar area of less than 500 $nm^2$, with one or both of the dimensions as small as a few nanometers was obtained. The same procedure was repeated for h-BN powder samples from another vendor (grades AC6004 and HCPL from Momentive Performance Materials, Inc.), and the results were generally similar. See FIG. 5.

Example 9

Exfoliated h-BN Nanosheets from Sonication Reaction of As-Received h-BN with Glycine Solution in Water

The as-received h-BN powder (20 mg) and glycine (80 mg, Acros) were added to deionized water (10 mL) and sonicated in a bath sonicator (Branson Model 2510) for 8 h. The mixture was centrifuged (~5000 rpm, 10 min) for the collection of the transparent but slightly milky supernatant. Water was added to the residue, the slurry was sonicated and subject to another round of centrifugation. The extraction cycle was repeated a few times, and the supernatants were combined, filtered through a coarse filter. The filtrate, an aqueous dispersion of exfoliated h-BN nanosheets, was obtained.

Example 10

Exfoliated h-BN Nanosheets from Sonication Reaction of As-Received h-BN with Glycine Solution in Potassium Hydroxide Solution

The as-received h-BN powder (20 mg) and glycine (80 mg) were added to an aqueous potassium hydroxide (KOH) solution (10 mL, 2.4 mM) and sonicated in a bath sonicator (Branson Model 2510) for 8 h. The mixture was centrifuged (~5000 rpm, 10 min) for the collection of the transparent but slightly milky supernatant. The same KOH solution was added to the residue, the slurry was sonicated and subject to another round of centrifugation. The extraction cycle was repeated a few times, and the supernatants were combined, filtered through a coarse filter. The filtrate, an aqueous dispersion of exfoliated h-BN nanosheets, was obtained.

Example 11

Exfoliated h-BN Nanosheets from Sonication Reaction of As-Received h-BN with L-Leucine Solution in Water

The as-received h-BN powder (20 mg) and L-leucine (100 mg, Aldrich) were added to deionized water (10 mL) and sonicated in a bath sonicator (Branson Model 2510) for 8 h. The mixture was centrifuged (~5000 rpm, 10 min) for the collection of the transparent but slightly milky supernatant. Water was added to the residue, the slurry was sonicated and subject to another round of centrifugation. The extraction cycle was repeated a few times, and the supernatants were combined, filtered through a coarse filter. The filtrate, an aqueous dispersion of exfoliated h-BN nanosheets, was obtained. The residue from the above centrifugation procedure was dried and used as h-BN starting material for second round of the same procedure described above. Another dispersion of exfoliation h-BN nanosheets was thus obtained.

Example 12

Exfoliated h-BN Nanosheets from Sonication Reaction of As-Received h-BN with Potassium Hydroxide Solution

The as-received h-BN powder (20 mg) was added to an aqueous KOH solution (10 mL, 0.1 M) and sonicated in a bath sonicator (Branson Model 2510) for 8 h. The mixture was centrifuged (~5000 rpm, 10 min) for the collection of the transparent but slightly milky supernatant. The same KOH solution was added to the residue, the slurry was sonicated and subject to another round of centrifugation. The extraction cycle was repeated a few times, and the supernatants were combined, filtered through a coarse filter. The filtrate, an aqueous dispersion of exfoliated h-BN nanosheets, was obtained.

Example 13

Exfoliated h-BN Nanosheets from Reaction of As-Received h-BN with Ferritin Protein

Figure 3:
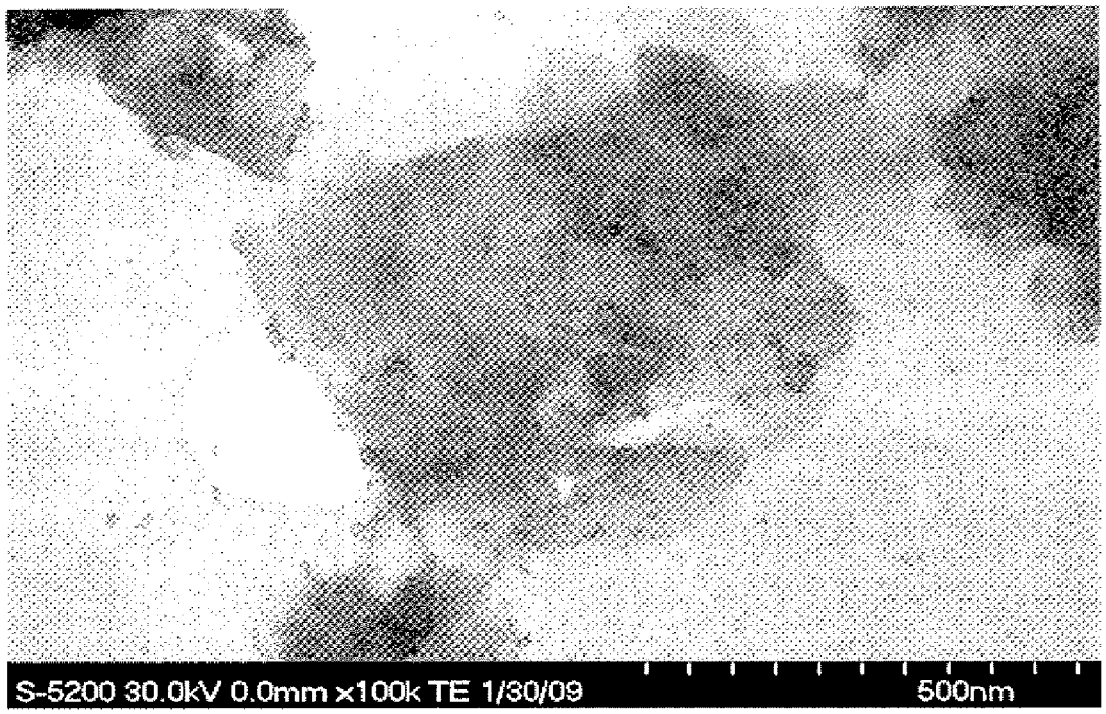
FIG. 3 is a transmission electron micrograph of ferritin protein-loaded exfoliated h-BN nanosheets.

The as-received h-BN powder (6 mg) was added to a phosphate buffer solution (pH=7.4) of ferritin (2 mL, 0.5 mg/mL, Type I, from horse spleen, Sigma) and stirred at room temperature for 4 days. The mixture was centrifuged (~5000 rpm, 10 min), and the precipitated solid was re-dispersed into PBS buffer and allowed to settle. The supernatant was obtained as an aqueous dispersion of exfoliated h-BN nanosheets. See FIG. 3.

Example 14

Exfoliated h-BN Nanosheets from Reaction of As-Received h-BN with Bovine Serum Albumin

The as-received h-BN powder (20 mg) was added to a phosphate buffer solution of bovine serum albumin (10 mL, 5 mg/mL, Sigma) and stirred at room temperature for 2 days. The mixture was centrifuged (~5000 rpm, 10 min), and the supernatant was collected as an aqueous dispersion of exfoliated h-BN nanosheets.

Example 15

Exfoliated h-BN Nanosheets from Reaction of As-Received h-BN with 1-Dodecanethiol The as-received h-BN powder (20 mg) was added to 1-dodecanethiol (10 mL, Acros) and sonicated in a bath sonicator (Branson Model 2510) for 8 h. The mixture was centrifuged (5000 rpm, 10 min) and the supernatant was collected as a dispersion of exfoliated h-BN nanosheets.

Example 16

Figure 4:
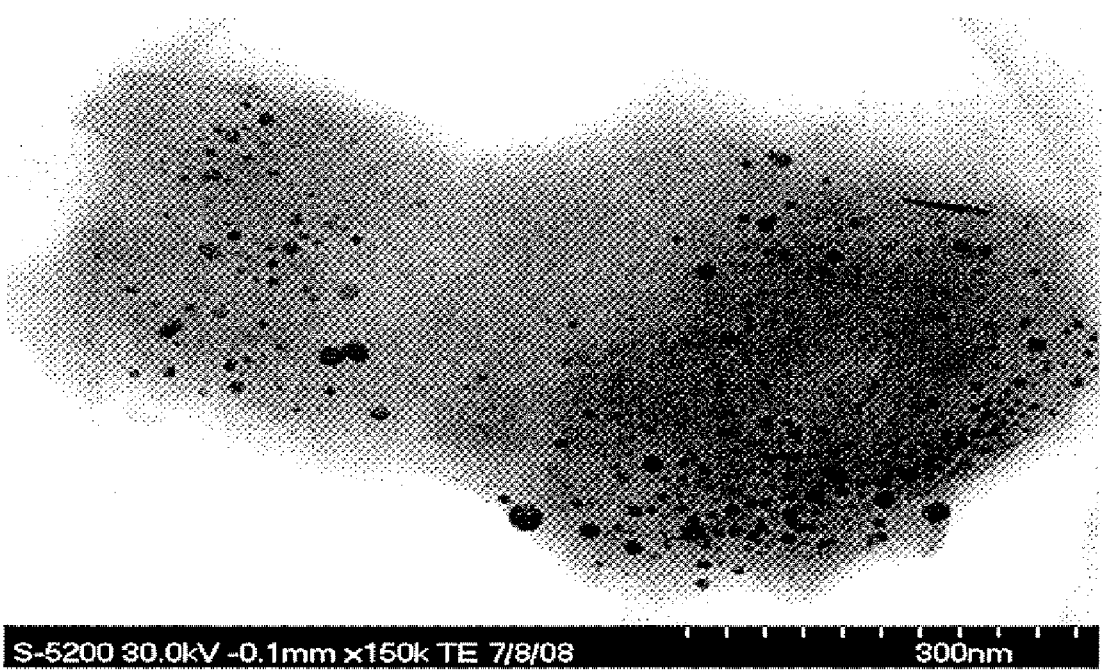
FIG. 4 is a transmission electron micrograph of a silver (Ag) nanoparticle-loaded exfoliated h-BN nanosheet.

Exfoliated h-BN Nanosheets from Thermal Reaction of Ag Nanoparticle-Loaded h-BN with Octadecylamine The as-received h-BN powder (500 mg) was ball-milled with silver acetate (70 mg, Aldrich) for 30 minutes. The mixture was heated to 350° C. at a rate of 5.4° C./min and kept for 3 h in a nitrogen oven to yield a Ag nanoparticle-loaded h-BN sample. This sample (20 mg) was mixed with octadecylamine (200 mg) and heated to 180° C. for 5 days under steady nitrogen flow. Upon cooling the reaction mixture to room temperature, THF (~15 mL) was added, and the slurry was briefly sonicated and centrifuged (~5000 rpm, 10 min) for the collection of the transparent but slightly milky, yellow-colored supernatant. The extraction cycle was repeated a few times, and the supernatants were combined to obtain a THF dispersion of exfoliated h-BN nanosheets. See FIG. 4. THF could be evaporated to obtain the Ag nanoparticle-loaded exfoliated h-BN nanosheets as solid powder, which could be re-dissolved into THF and other organic solvents such as chloroform.

Example 17

Polymer Composite from Solution Mixing of Exfoliated h-BN Nanosheets in Water with a Poly(vinyl alcohol) Followed Wet-Casting An aqueous dispersion of exfoliated h-BN nanosheets from Example 8 (1 mL, 1 mg/mL) was added to an aqueous solution of poly(vinyl alcohol) (100 mg/mL, 1 mL, Aldrich, 98% hydrolyzed, molecular weight 13,000-23,000). The mixture was stirred, casted on a glass substrate, and dried overnight in continuous nitrogen flow to obtain a transparent polymer-exfoliated h-BN nanosheets composite with 1 wt % h-BN content.

Having thus described and detailed the present invention, it is to be understood that many obvious and apparent variations in construction and arrangement may be made without departing from the overall scope and spirit thereof as defined by the appended claims. Furthermore, it is intended that the foregoing specifications and accompanying drawings be interpreted as illustrative rather than in a limiting sense.

What is claimed as new and desired to be secured by Letters Patent of the United States is:

1. A method of exfoliating sheets of hexagonal boron nitride, the method comprising the steps of:
   providing raw hexagonal boron nitride;
   providing a Lewis base;
   mixing together the hexagonal boron nitride and the Lewis base;
   reacting the mixture of hexagonal boron nitride and Lewis base to form a reaction mixture of functionalized hexagonal boron nitride and byproducts;
   after reacting, adding a solvent to the reaction mixture and separating the functionalized hexagonal boron nitride from the byproducts.

2. The method of claim 1, wherein the form of raw hexagonal boron nitride is powder, bulk crystal, or combinations thereof.

3. The method of claim 1, wherein the Lewis base is selected from the group consisting of; amine compounds, sulfur compounds, phosphorous compounds, oxide compounds, water, amino acids, protein molecules and mixtures thereof.

4. The method of claim 1, wherein the Lewis base is selected from the group consisting of water, octadecylamine, 1-dodecanethiol, amine-terminated poly(ethylene glycol), glycine, leucine, ferritin protein, bovine serum albumin, potassium hydroxide and sodium hydroxide and mixtures thereof.

5. The method of claim 1, wherein the reacting step includes heating, sonication, ball-milling, mechanical shearing, microwave, or radiation of the mixture.

6. The method of claim 1, wherein the mixture is reacted for a period of time from about 0.5 hour to about 7 days.

7. The method of claim 1, further comprising the steps of
   after the reacting and separating steps, providing the functionalized hexagonal boron nitride;
   providing a second Lewis base;
   mixing together the functionalized hexagonal boron nitride and second Lewis base;
   reacting the mixture of functionalized hexagonal boron nitride and second Lewis base to form a second reaction mixture of a second functionalized hexagonal boron nitride and byproducts; and
   after reacting, adding a second solvent to the second reaction mixture and separating the second functionalized hexagonal boron nitride from the byproducts.

8. The method of claim 7, wherein the second Lewis base is the same as the first Lewis base.

9. The method of claim 7, wherein the second Lewis base is different from the first Lewis base.

10. The method of claim 1, wherein the reacting step consists of heating, ball-milling, mechanical shearing, microwave, or radiation of the mixture.

11. A polymer composite comprised of hexagonal boron nitride prepared according to claim 1 and at least one polymer.

12. A polymer composite according to claim 11, wherein the polymer is a; polycarbonate, polyacrylate, polyacrylonitrile, polyester, polyamide, polystyrene (including high impact strength polystyrene), polyurethane, polyurea, poly (urethaneurea), polyepoxy, poly(acrylonitrile butadiene styrene), polyimide, polyarylate, poly(arylene ether), poly(vinyl acetate), polyethylene, polypropylene, polyphenylene sulfide, poly(vinyl ester), poly(vinyl chloride), poly(vinyl alcohol), bismaleimide polymer, polyanhydride, liquid crystalline polymer, cellulose polymer, and combinations thereof.

13. An article of manufacture produced from the polymer composite of claim 12.

14. An article of manufacture according to claim 13, wherein the article is a fiber, a fabric, a film, a coating, a molding, a foam, a tube, an adhesive, a fiber reinforced article, a laminated article or combinations thereof.

* * * * *